US009684477B2

(12) United States Patent
Nagai (10) Patent No.: US 9,684,477 B2
(45) Date of Patent: Jun. 20, 2017

(54) METHOD AND DEVICE FOR IMAGE PROCESSING AND COMPUTER-READABLE RECORDING MEDIUM (71) Applicant: Tasuku Nagai, Kanagawa (JP)

(72) Inventor: Tasuku Nagai, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 0 days.

(21) Appl. No.: 14/879,527

(22) Filed: Oct. 9, 2015

(65) Prior Publication Data
US 2016/0110140 A1    Apr. 21, 2016

(30) Foreign Application Priority Data

Oct. 17, 2014    (JP) .................................. 2014-212815

(51) Int. Cl.
H04N 1/60 (2006.01)
H04N 1/46 (2006.01)
G06F 3/12 (2006.01)
H04N 1/00 (2006.01)
G06K 15/12 (2006.01)
G06K 15/02 (2006.01)

(52) U.S. Cl.
CPC .......... G06F 3/1219 (2013.01); G06F 3/1229 (2013.01); G06F 3/1285 (2013.01); G06K 15/128 (2013.01); G06K 15/1871 (2013.01); H04N 1/00023 (2013.01); G06K 15/1827 (2013.01); G06K 15/1869 (2013.01); H04N 1/60 (2013.01)

(58) Field of Classification Search
None
See application file for complete search history.

(56) References Cited

U.S. PATENT DOCUMENTS

| 4,908,666 | A | * | 3/1990 | Resch, III | .......... | G03G 15/0849 |
| | | | | | | 118/689 |
| 5,103,303 | A | * | 4/1992 | Shoji | ....................... | G06K 15/02 |
| | | | | | | 358/1.11 |
| 5,122,843 | A | * | 6/1992 | Yokoyama | ........... | G03G 13/013 |
| | | | | | | 399/231 |
| 5,581,358 | A | * | 12/1996 | Seto | ................... | G06K 15/1223 |
| | | | | | | 347/131 |
| 5,661,564 | A | * | 8/1997 | Tomida | ................ | G03G 15/326 |
| | | | | | | 358/296 |
| 5,668,635 | A | * | 9/1997 | Tomida | .................. | G03G 15/32 |
| | | | | | | 358/296 |
| 5,685,653 | A | * | 11/1997 | Bringhurst | ............... | B41J 31/16 |
| | | | | | | 400/197 |

(Continued)

FOREIGN PATENT DOCUMENTS

JP    2014-032436    2/2014

Primary Examiner — Madelein Nguyen
(74) Attorney, Agent, or Firm — Harness, Dickey & Pierce, P.L.C.

(57) ABSTRACT

According to an aspect of the invention, an image processing device includes a storage that stores character information, which is information affecting legibility of a character, on a character-by-character basis, and circuitry configured to determine a toner saving ratio for each character contained in a to-be-printed image so that legibility of the character achieves a preset target value at the determined toner saving ratio by assessing the legibility of the character based on the character information.

20 Claims, 9 Drawing Sheets

(56) References Cited

U.S. PATENT DOCUMENTS

| | | | | |
|---|---|---|---|---|
| 6,103,440 A * | 8/2000 | Lohr | G03G 9/08708 | 430/110.1 |
| 6,172,776 B1 * | 1/2001 | Murai | H04N 1/6022 | 358/515 |
| 7,174,042 B1 * | 2/2007 | Simmons | G06K 9/00852 | 345/169 |
| 7,626,742 B2 * | 12/2009 | Cho | H04N 1/6058 | 358/515 |
| 7,751,623 B1 * | 7/2010 | Simmons | G06F 17/242 | 345/173 |
| 8,305,639 B2 * | 11/2012 | Miyagi | H04N 1/56 | 358/1.9 |
| 8,918,045 B2 * | 12/2014 | Sakurai | G03G 15/6585 | 399/322 |
| 9,229,347 B2 * | 1/2016 | Kishida | G03G 13/08 | |
| 9,298,119 B2 * | 3/2016 | Yaguchi | G03G 9/1075 | |
| 2002/0097909 A1 * | 7/2002 | Perrone | G06K 9/222 | 382/187 |
| 2004/0213603 A1 * | 10/2004 | Shigeta | G03G 15/0877 | 399/254 |
| 2004/0252341 A1 * | 12/2004 | Adachi | G06F 3/1204 | 358/1.18 |
| 2005/0154562 A1 * | 7/2005 | Matsuura | G06F 11/008 | 702/185 |
| 2005/0271428 A1 * | 12/2005 | Yaguchi | G03G 15/09 | 399/282 |
| 2007/0064254 A1 * | 3/2007 | Kim | G06F 3/1204 | 358/1.13 |
| 2007/0206228 A1 * | 9/2007 | Miyagi | H04N 1/6022 | 358/3.21 |
| 2008/0018937 A1 * | 1/2008 | Kimakura | H04N 1/4092 | 358/3.1 |
| 2008/0036775 A1 * | 2/2008 | Wu | G06T 11/203 | 345/469 |
| 2008/0117469 A1 * | 5/2008 | Ueda | G06F 21/608 | 358/3.28 |
| 2009/0034002 A1 * | 2/2009 | Shibaki | H04N 1/6072 | 358/2.1 |
| 2009/0147313 A1 * | 6/2009 | Miyagi | H04N 1/2307 | 358/2.1 |
| 2009/0279108 A1 * | 11/2009 | Hoshi | H04N 1/3871 | 358/1.2 |
| 2010/0150583 A1 * | 6/2010 | Hitaka | G03G 15/553 | 399/28 |
| 2011/0019213 A1 * | 1/2011 | Safonov | G06K 15/128 | 358/1.9 |
| 2011/0135337 A1 * | 6/2011 | Saito | G03G 15/553 | 399/79 |
| 2011/0157273 A1 * | 6/2011 | Tendler | B41J 2/2054 | 347/19 |
| 2012/0050766 A1 * | 3/2012 | Saiki | H04N 1/6027 | 358/1.9 |
| 2013/0038908 A1 * | 2/2013 | Nagai | H04N 1/605 | 358/3.23 |
| 2013/0107284 A1 * | 5/2013 | Hayashi | G06K 15/00 | 358/1.2 |
| 2013/0250339 A1 * | 9/2013 | Ming | H04N 1/00331 | 358/1.14 |
| 2014/0146328 A1 * | 5/2014 | Kawaguchi | G06K 15/1869 | 358/1.2 |
| 2014/0168711 A1 * | 6/2014 | Nakano | G06K 15/189 | 358/2.1 |
| 2014/0211263 A1 * | 7/2014 | Kobayashi | G06K 15/1822 | 358/2.1 |
| 2014/0285494 A1 * | 9/2014 | Jo | G09G 5/24 | 345/471 |
| 2015/0124269 A1 * | 5/2015 | Kang | G06F 3/1219 | 358/1.2 |
| 2015/0172512 A1 * | 6/2015 | Otake | H04N 1/644 | 358/1.9 |
| 2015/0261479 A1 * | 9/2015 | Park | G06F 3/1219 | 358/1.9 |
| 2015/0332120 A1 * | 11/2015 | Litvak | G06K 9/6202 | 382/176 |
| 2015/0355868 A1 * | 12/2015 | Doi | G06F 3/1219 | 358/1.18 |
| 2016/0132013 A1 * | 5/2016 | Soma | H04N 1/603 | 358/1.1 |

* cited by examiner

| | [1] GOTHIC TYPE 36 POINTS 6 STROKES BLACK (LUMINANCE: 0) | [2] MING TYPE 36 POINTS 6 STROKES BLACK (LUMINANCE: 0) | [3] MING TYPE 10 POINTS 6 STROKES BLACK (LUMINANCE: 0) | [4] MING TYPE 10 POINTS 27 STROKES BLACK (LUMINANCE: 0) | [5] MING TYPE 10 POINTS 27 STROKES MAGENTA (LUMINANCE: 105) |
|---|---|---|---|---|---|
| (A) WITHOUT TONER SAVER MODE | committee | 字 | 字 | 鑢 | 鑢 |
| (B) TONER SAVING RATIO: 50% | (faded) | (faded) | (faded) | (faded) | (faded) |

FIG.7

PAPER COLOR: LIGHT RED (LUMINANCE: 216)
CHARACTER COLOR: LIGHT MAGENTA (LUMINANCE: 180)

(A)
BEFORE CONTOUR
EXTRACTION PROCESS

PAPER COLOR: LIGHT RED (LUMINANCE: 216)
CHARACTER COLOR (ONLY CONTOURS): BLACK (LUMINANCE: 0)

(B)
AFTER CONTOUR
EXTRACTION PROCESS

METHOD AND DEVICE FOR IMAGE PROCESSING AND COMPUTER-READABLE RECORDING MEDIUM

CROSS-REFERENCE TO RELATED APPLICATIONS

The present application claims priority to and incorporates by reference the entire contents of Japanese Patent Application No. 2014-212815 filed in Japan on Oct. 17, 2014.

BACKGROUND OF THE INVENTION

1. Field of the Invention

The present invention relates to a method and a device for image processing as well as to a computer-readable recording medium.

2. Description of the Related Art

Some conventional types of image forming apparatuses have a toner saver function of printing an image with a reduced amount of colored material such as toner than normal. Some types of image forming apparatuses have a multiple-up (N-up) printing function of printing an image containing multiple pages (N pages) of an original document on a single sheet of paper. Although both the toner saver function and the N-up printing function allow reducing toner consumption per a page of the document, if the toner consumption is excessively reduced by the toner saver function, a problem of a decrease in character legibility can arise. A configuration that applies an optimum toner saving ratio depending on a character size to solve this problem is known.

For example, Japanese Laid-open Patent Application No. 2014-32436 discloses a configuration for applying an appropriate toner saving ratio by analyzing a size of a character in data representing an original document image and determining a toner saving ratio based on the character size.

However, conventional techniques such as those noted above are disadvantageous in the following respects. The conventional configuration that applies an optimum toner saving ratio depending on a character size does not take difference in structure and/or color between individual characters into account. For this reason, it has been a problem with the conventional techniques that legibility of a character of relatively complicated structure or light color is impaired by toner saving and that toner consumption of a character of relatively simple structure or thick color cannot be reduced satisfactorily. This problem can arise also with the technique disclosed in Japanese Laid-open Patent Application No. 2014-32436. This is because the toner saving is carried out without taking difference in structure and/or color between individual characters into account.

In view of the above circumstances, there is a need for a technique that allows reducing an amount of toner consumed in printing characters appropriately while avoiding reduction in legibility of the printed characters.

SUMMARY OF THE INVENTION

It is an object of the present invention to at least partially solve the problems in the conventional technology.

According to the present invention, there is provided an image processing device comprising: a storage that stores therein character information on a character-by-character basis, the character information being information affecting legibility of a character; and circuitry configured to determine a toner saving ratio for each character contained in a to-be-printed image so that legibility of the character achieves a preset target value at the determined toner saving ratio by assessing the legibility of the character based on the character information.

The present invention also provides an image processing method for an image processing device including a storage storing character information on a character-by-character basis, the character information being information affecting legibility of a character, the image processing method comprising determining a toner saving ratio for each character contained in a to-be-printed image so that legibility of the character achieves a preset target value at the determined toner saving ratio by assessing the legibility of the character based on the character information.

The present invention also provides a non-transitory computer-readable recording medium containing a computer program that, when executed by at least one processor of a computing device including a storage storing character information on a character-by-character basis, the character information being information affecting legibility of a character, causes the computing device to execute determining a toner saving ratio for each character contained in a to-be-printed image so that legibility of the character achieves a preset target value at the determined toner saving ratio by assessing the legibility of the character based on the character information.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

First Embodiment

An image forming apparatus according to a first embodiment of the present invention performs the following control operations when performing printing in a toner saver mode. More specifically, the image forming apparatus includes a character structure database and a toner-saving-ratio determining unit. Values obtained by quantifying structural complexities of characters on a character-by-character basis are stored in the character structure database in advance. Desired print quality is specified before printing. During printing, the toner-saving-ratio determining unit determines legibility based on a size, complexity, font type, and color of a character for each of characters in an image of an original document, thereby applying a toner saving ratio, at which the desired print quality is achieved, to each of the characters. This will be described more specifically below.

In the first embodiment, an image forming apparatus 100 is embodied as a multifunction peripheral, such as a popularly-known electrophotographic printer, having a function of forming a color image. Such an image forming apparatus causes toner to stick to a latent image formed on an image bearer and then transfers the toner onto recording paper. A toner saver function is provided in some type of such image forming apparatuses to minimize consumption of the toner. Accordingly, the toner saver function is also applicable to an image forming apparatus that uses ink as consumable in lieu of toner. Hence, the image forming apparatus may be embodied as an inkjet printer that performs printing using ink droplets.

Figure 1:
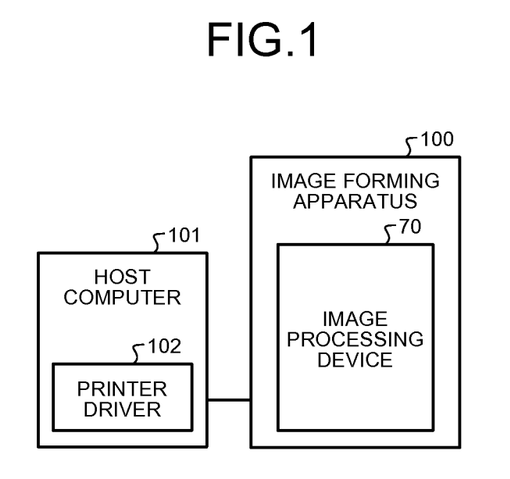
FIG. 1 is a block diagram illustrating an example configuration of a system including an image processing device according to a first embodiment of the present invention.

FIG. 1 is a block diagram illustrating an example configuration of a system including an image processing device according to the first embodiment. An image processing device 70 performs predetermined processing on image data and outputs the processed image data to an optical writing system (not shown) of an image forming unit 80 included in the image forming apparatus 100.

A host computer 101 is connected to a network (not shown) or the like, includes a printer driver 102, and has a predetermined interface. The host computer 101 is configured to output image data representing a to-be-printed image as a file to the image forming apparatus 100 via the printer driver 102.

Figure 2:
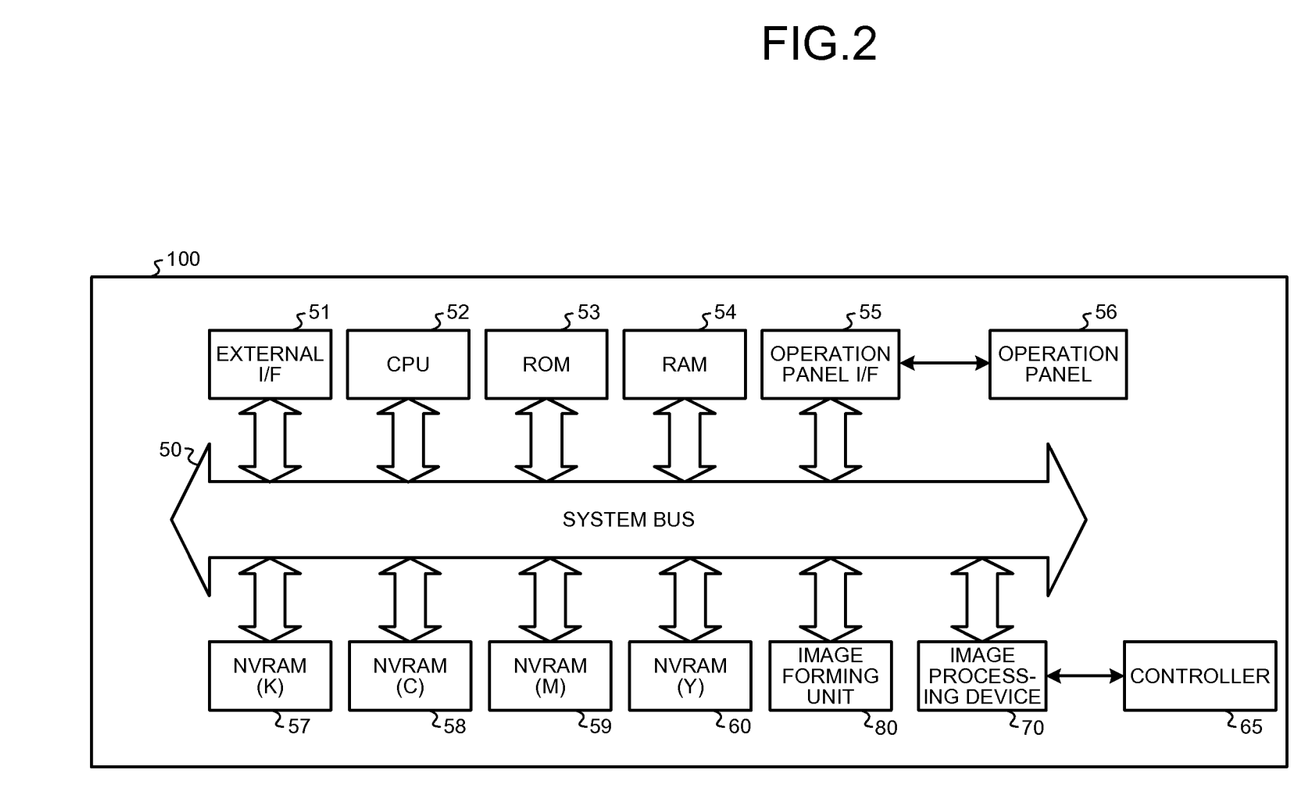
FIG. 2 is a block diagram illustrating an example hardware structure of an image forming apparatus according to the first embodiment.

FIG. 2 is a block diagram illustrating an example hardware structure of the image forming apparatus 100 according to the first embodiment. The image forming apparatus 100 includes a system bus 50, an external I/F 51, a CPU (central processing unit) 52, a ROM (read-only memory) 53, a RAM (random access memory) 54, an operation panel I/F 55, an operation panel 56, NVRAMs 57, 58, 59, and 60, a controller 65, the image processing device 70, and an image forming unit 80. The CPU 52 provides overall control of accesses to and from devices of various types connected to the system bus 50 based on control program instructions or the like stored in the ROM 53. The CPU 52 controls inputs/outputs to/from electrical devices (not shown) such as a sensor, a motor, a clutch, and a heater connected via I/O (none of which is shown).

Figure 5:
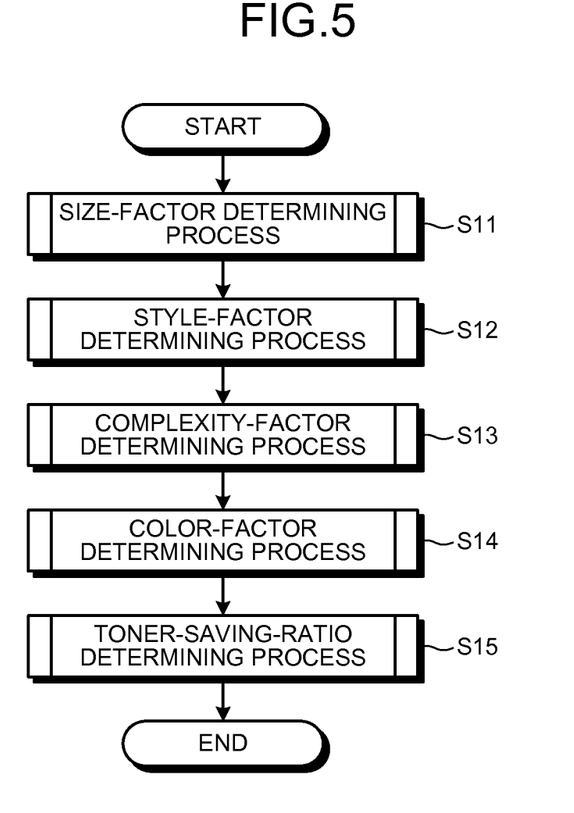
FIG. 5 is a flowchart of processes to be performed by the toner-saving-ratio determining unit illustrated in FIG. 4.
Figure 9:
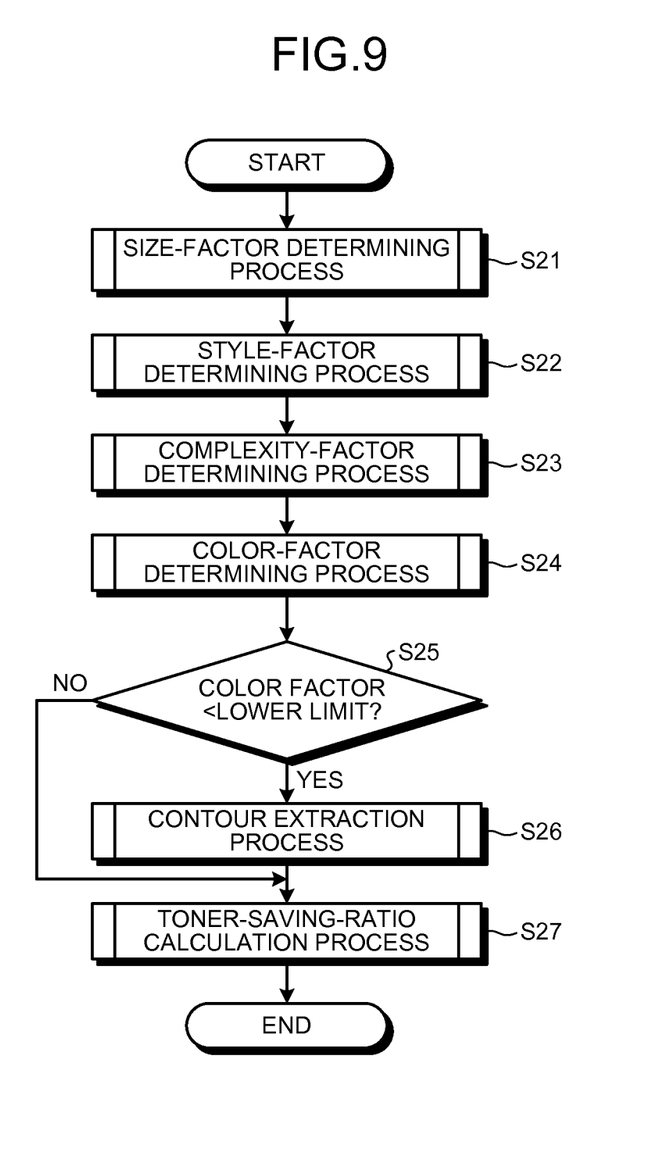
FIG. 9 is a flowchart of processes to be performed by the toner-saving-ratio determining unit illustrated in FIG. 8.

More specifically, the ROM 53 stores the control program instructions, example flowcharts therefor are illustrated in FIGS. 5 and 9 which will be described later, for the CPU 52 and the like. The CPU 52 executes the control program instructions stored in the ROM 53. The external I/F 51 allows carrying out communications with an external device such as the host computer 101 via the external I/F 51.

The RAM 54 is a RAM functioning as a main memory, a working area, and the like of the CPU 52 and used as an area where recorded data is loaded, an area where environmental data is stored, and the like. Each of the NVRAMs 57, 58, 59, and 60 is mounted on one of toner containers (not shown) for respective colors to store information about a remaining amount of toner in the toner container and the like. The operation panel 56 connected to the system bus 50 via the operation panel I/F 55 can be used to configure a printer mode and the like.

The image processing device 70 receives image data from the controller 65 and transmits the image data to the optical writing system (not shown). The image processing device 70 also determines a toner saving ratio, which will be described later, based on the image data received from the controller 65.

The image forming unit 80 includes the writing optical system that performs optical writing in accordance with image data, an image formation system, a fixing system, and a paper feeding/conveyance system to print image data on recording paper.

Figure 3:
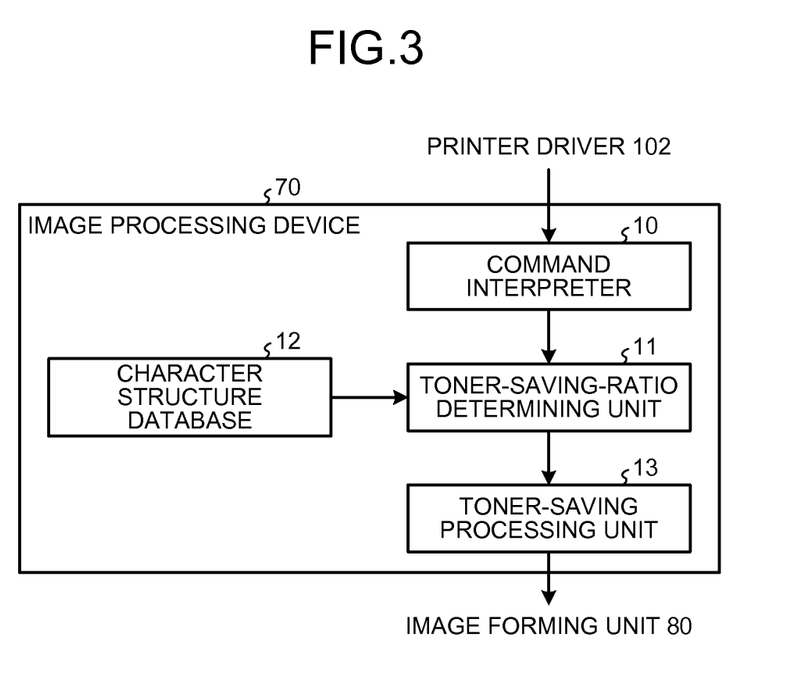
FIG. 3 is a block diagram illustrating a functional configuration of the image processing device according to the first embodiment.

FIG. 3 is a block diagram illustrating a functional configuration of the image processing device 70 according to the first embodiment. The image processing device 70 is implemented in the CPU 52 and provides functions of a command interpreter 10, a toner-saving-ratio determining unit 11, a character structure database 12 serving as a storage, and a toner-saving processing unit 13.

All or a part of the functional configuration of the image processing device 70 may be implemented in hardware. FIG. 3 illustrates an example where the functions of the command interpreter 10, the toner-saving-ratio determining unit 11, and the toner-saving processing unit 13 are mounted on the image forming apparatus 100. Alternatively, when implemented in software, the functions may be mounted on the host computer 101.

The system is configured such that to-be-printed image data generated by the host computer 101 is sent to the image forming apparatus 100, where the image data is printed by the image forming unit 80.

The printer driver 102 generates PDL (page description language) data from image data of an original document or image data of a document generated by the host computer 101 in accordance with user-specified print settings and transfers the PDL data to the command interpreter 10. The PDL data includes the following information.

The PDL data may include a font size, N of N-up printing, a scaling factor, font type (e.g., Gothic type or Ming type), font color, whether or not boldface is selected, whether or not the toner saver mode is selected, print quality in the toner saver mode (legibility target value), and paper color.

The command interpreter 10 determines attributes of objects in the image data of the document. The attribute may be character, photo, graphic, or the like. If the toner saver mode is selected, the command interpreter 10 applies a default toner saving ratio for photo objects and that for graphic objects to photo objects and graphic objects, respectively. However, toner saving ratios, which are to be determined by the toner-saving-ratio determining unit 11 later, for character objects are not applied at this stage.

The character structure database 12 stores the following information to be used by the toner-saving-ratio determining unit 11. The character structure database 12 serving as the storage stores character information, which is information affecting legibility of a character, on a character-by-character basis. More specifically, character information such as the number of strokes (hereinafter, "stroke count") of each character and magnitude of effect (hereinafter, "font factor")

of the toner server mode on each font type is quantified, and stored and accumulated in the character structure database 12 in advance.

The character structure database 12 may be implemented in a nonvolatile storage device such as a hard disk drive, for example. Although the function of the character structure database 12 is mounted on the image forming apparatus 100 in FIG. 3, the function may alternatively be mounted on the host computer 101. Further alternatively, a form in which the host computer 101 or the image forming apparatus 100 accesses an external server where the character structure database 12 is constructed via a network (not shown) may be employed.

The toner-saving-ratio determining unit 11 determines, for each character contained in a to-be-printed image, a toner saving ratio at which legibility of the character achieves a preset target value by assessing the legibility based on the character information stored in the character structure database 12. Detail of the toner-saving-ratio determining unit 11 will be described later.

The toner-saving processing unit 13 performs a toner saving process on the to-be-printed image in accordance with the toner saving ratios determined by the toner-saving-ratio determining unit 11.

The image forming unit 80 performs an image forming process according to a predetermined image formation procedure, thereby printing the image on which the toner saving process has been performed by the toner-saving processing unit 13 on recording paper.

A method for determining the toner saving ratio according to the first embodiment is described below. Factors that affect character legibility in the toner saver mode can include a character size, style, structural complexity of each character, and color. The character legibility can be defined as given in Equation (1):

$$\text{legibility} = Sz \times Tp \times Cp \times Cl \times Sv \tag{1}$$

where Sz is a size factor, Tp is a style factor, Cp is a complexity factor, Cl is a color factor, and Sv is a toner saving ratio.

The factors involved in the legibility can be determined by the following methods. The toner saving ratio Sv is determined in accordance with the definition given in Equation (2) so that the legibility achieves the preset legibility target value.

$$Sv = (\text{legibility target value}) / (Sz \times Tp \times Cp \times Cl) \tag{2}$$

The smaller the toner saving ratio Sv, the smaller the toner consumption (i.e., the lower the image density). The legibility target value is specified by a user using the printer driver 102 depending on a desired print quality (legibility).

The methods for determining the factors are described below. The smaller the character size, the smaller the magnitude of effect of the toner saving ratio Sv on the legibility. Accordingly, the size factor Sz is determined from Equation (3) below.

$$Sz = (\text{font size}) \times (N \text{ of } N\text{-up printing}) \times (\text{scaling factor}) \tag{3}$$

With regard to the style factor Tp, the magnitude of effect of the toner saver mode on the legibility is larger when the character is of a constant-width font (such as Gothic type) than when the character is of a varying-width font (such as Ming type). To take this into account, font factors of respective fonts are stored in the character structure database 12 in advance. Furthermore, a decrease in legibility due to the toner saver mode is smaller when the character is of a boldface font than when the character is of a normal font. Accordingly, when the boldface is selected, the style factor Tp is to be multiplied by a boldface factor (which may be two, for example). The style factor Tp is determined from Equation (4) below.

$$Tp = (\text{font factor}) \times (\text{boldface factor}) \tag{4}$$

With regard to the complexity factor Cp, the lower the character's structural complexity, the smaller the magnitude of effect of the toner saving ratio Sv on the legibility. To take this into account, the complexity factor Cp may preferably be determined by retrieving corresponding character's complexity from characters' complexities stored on a character-by-character basis in advance. The character's complexities are preferably determined based on stroke counts; this is because character's complexities have high correlation with stroke counts.

With regard to the color factor Cl, the larger the difference in luminance between color of paper and color of the character, the smaller the magnitude of effect of the toner saving ratio Sv on the legibility. Accordingly, the color factor Cl is determined from Equation (5) below.

$$Cl = ((\text{luminance of paper color}) - (\text{luminance of character color})) / 255 \tag{5}$$

The luminance can be calculated by converting RGB values using Equation (6) below which is generally used in the conversion. In Equation (6), Y is the luminance. For example, when the color of paper where an image is to be printed is white (luminance value: 255) and the character color is black (luminance value: 0), the Cl is 1 (maximum value).

$$Y = 0.2990 * R + 0.5870 * G + 0.1140 * B \tag{6}$$

Figure 4:
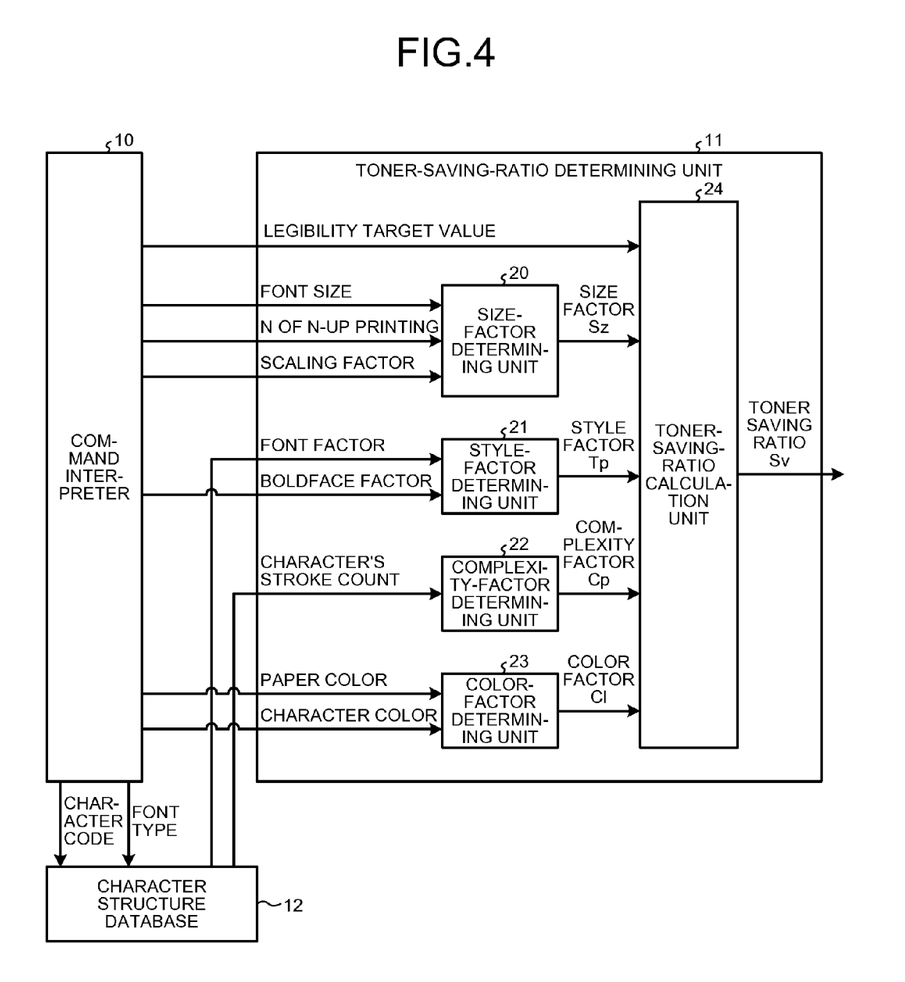
FIG. 4 is a block diagram illustrating an internal configuration of a toner-saving-ratio determining unit of the first embodiment.

FIG. 4 is a block diagram illustrating an internal configuration of the toner-saving-ratio determining unit 11 of the first embodiment. The toner-saving-ratio determining unit 11 includes a size-factor determining unit 20, a style-factor determining unit 21, a complexity-factor determining unit 22, a color-factor determining unit 23, and a toner-saving-ratio calculation unit 24.

The command interpreter 10 enters a character code and a font type into the character structure database 12. The command interpreter 10 feeds information about a font size, N of N-up printing, and a scaling factor into the size-factor determining unit 20. The command interpreter 10 feeds information about a boldface factor into the style-factor determining unit 21. The command interpreter 10 feeds information about a paper color and a character color into the color-factor determining unit 23. The command interpreter 10 enters the character code and the font type into the character structure database 12.

The character structure database 12 feeds a font factor into the style-factor determining unit 21. The character structure database 12 feeds a stroke count of the character into the complexity-factor determining unit 22.

The size-factor determining unit 20 determines the size factor Sz from the information about the font size, N of N-up printing, and the scaling factor. The size factor Sz is calculated from Equation (3) described earlier.

The style-factor determining unit 21 determines the style factor Tp from the information about the font factor and the boldface factor. The style factor Tp is calculated from Equation (4) described earlier.

The complexity-factor determining unit 22 determines the complexity factor Cp from the stroke count of the character.

The color-factor determining unit 23 determines the color factor Cl from the information about the paper color and the character color. The color factor Cl is calculated using Equations (5) and (6) described earlier.

The toner-saving-ratio calculation unit 24 calculates the toner saving ratio Sv from the factors determined by the size-factor determining unit 20, the style-factor determining unit 21, the complexity-factor determining unit 22, and the color-factor determining unit 23 and the legibility target value.

As described above, with the configuration illustrated in FIG. 2, the factors are determined based on information fed from the command interpreter 10 and the character structure database 12. The toner-saving-ratio calculation unit 24 determines the toner saving ratio Sv from the factors and outputs the determined toner saving ratio Sv.

FIG. 5 is a flowchart of processes to be performed by the toner-saving-ratio determining unit 11 illustrated in FIG. 4. Referring to FIG. 5, the functional units of the toner-saving-ratio determining unit 11 illustrated in FIG. 4 perform the processes described below on a target character image (hereinafter, sometimes referred to as "character object") fed via the command interpreter 10.

The processes for determining the toner saving ratio illustrated in FIG. 5 are performed as follows. The size-factor determining unit 20 determines the size factor Sz from a font size, N of N-up printing, and a scaling factor fed from the command interpreter 10 (step S11). Thereafter, the style-factor determining unit 21 determines the style factor Tp from a font factor fed from the character structure database 12 and a boldface factor fed from the command interpreter 10 (step S12).

Thereafter, the complexity-factor determining unit 22 determines the complexity factor Cp from a stroke count of the character fed from the character structure database 12 (step S13). Thereafter, the color-factor determining unit 23 determines the color factor Cl from paper color and character color fed from the command interpreter 10 (step S14). Thereafter, the toner-saving-ratio calculation unit 24 calculates the toner saving ratio Sv from the determined factors (step S15).

Figure 6:
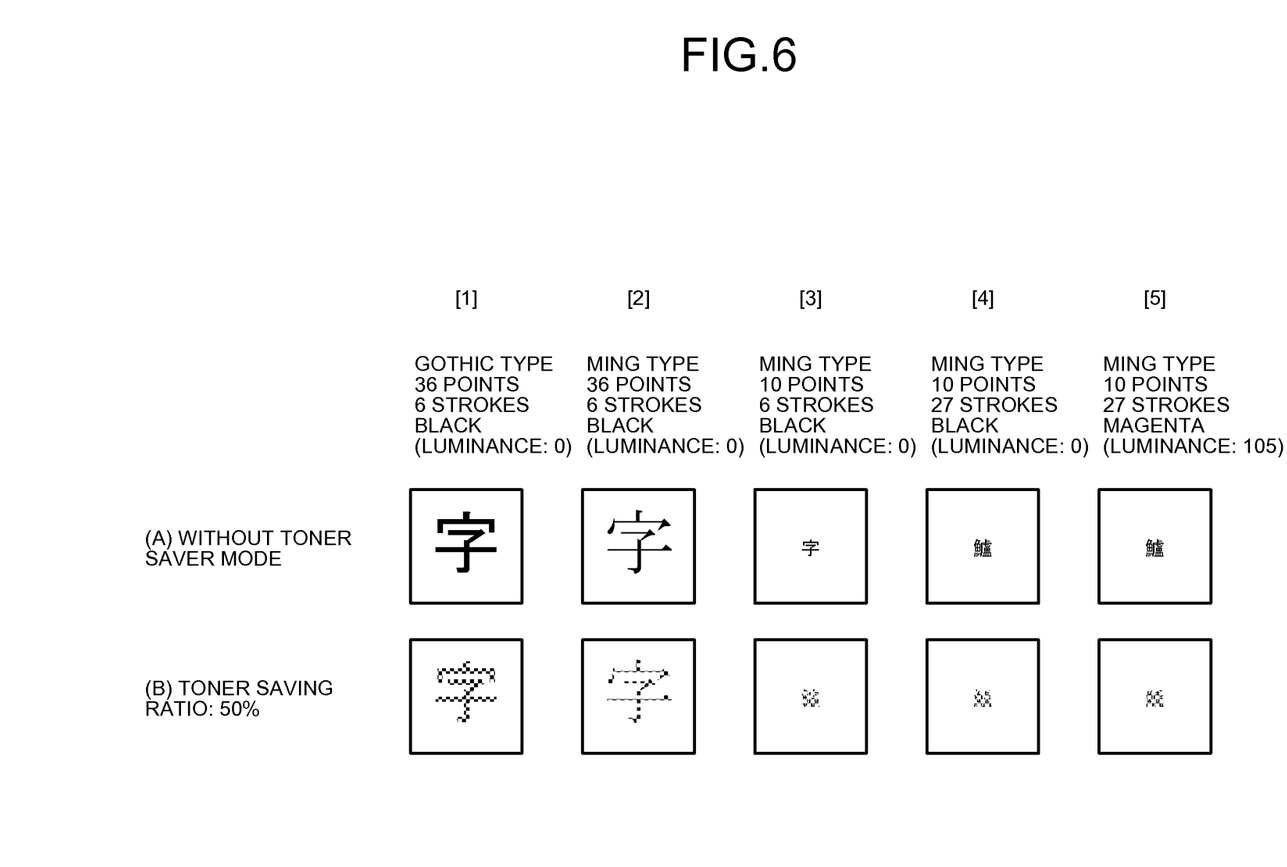
FIG. 6 is a diagram describing how legibility varies among characters.

How legibility varies among characters is described below with reference to FIG. 6. FIG. 6 illustrates an example of how the toner saver mode affects legibility of characters that differ in font type, font size, stroke count, and color. FIG. 6 illustrates a difference between an image (indicated by (A)) of a character indicated by [1] (Gothic type, 36 points, 6 strokes, black (luminance: 0)) formed without applying the toner saver mode and an image (indicated by (B)) of the same formed in the toner saver mode. FIG. 6 also illustrates differences between images (indicated by (A)) of the following characters formed without applying the toner saver mode and images (indicated by (B)) of the same formed in the toner saver mode: a character (Ming type, 36 points, 6 strokes, black (luminance: 0)) indicated by [2]; a character (Ming type, 10 points, 6 strokes, black (luminance: 0)) indicated by [3]; a character (Ming type, 10 points, 27 strokes, black (luminance: 0)) indicated by [4]; and a character (Ming type, 10 points, 27 strokes, magenta (luminance: 105)) indicated by [5].

As described above, in the first embodiment, the image processing device 70 includes the character structure database 12 and the toner-saving-ratio determining unit 11. Values obtained by quantifying structural complexities of characters on a character-by-character basis are stored in the character structure database 12 in advance. Before printing, a desired print quality is specified. During printing, the toner-saving-ratio determining unit 11 determines legibility (using Equation (1) described earlier) of each character in an image of an original document based on a size, complexity, font type, and color of the character. The toner-saving-ratio determining unit 11 thus determines the toner saving ratio Sv, at which the desired print quality can be achieved, for the each character. As a result, the toner saving ratio Sv that is optimized depending on structure and color of the character can be applied.

Furthermore, the toner-saving-ratio determining unit 11 determines a character size based on a font size of the character in the to-be-printed image data, N of N-up printing of an original document, and a scaling factor. Accordingly, the toner-saving-ratio determining unit 11 can apply an appropriate toner saving ratio with not only an original character size of the to-be-printed image data fed to the image processing device 70 but also the character size which may be different from the original character size due to print settings into account.

The toner-saving-ratio determining unit 11 determines structural complexity of each character from a stroke count of the character. Use of the stroke count which is a measure of complexity specific to each character facilitates quantification of complexity.

The character structure database 12 stores information about the stroke count of each character so that the information can be used in determining the toner saving ratio Sv. Accordingly, the toner-saving-ratio determining unit 11 can automatically obtain the stroke count of each character by retrieving the stroke count from the character structure database 12.

The toner-saving-ratio determining unit 11 is capable of specifying color of paper where printing is to be performed and assesses legibility by using a difference in luminance between color of each character and the paper color. Accordingly, the toner-saving-ratio determining unit 11 can apply the toner saving ratio Sv of an appropriate value at which legibility can be ensured even if colored paper, rather than normal white paper, is used.

Second Embodiment

In the first embodiment described above, when the difference in luminance between the paper color and the character color is small (as in a case where the paper color is light red and the character color is magenta), the color factor Cl is small and, accordingly, the toner saving ratio Sv is set to a large value so that legibility achieves a target value. However, because there is an upper limit to the density printable by the image forming unit 80, there is an upper limit to the toner saving ratio Sv (the upper limit is reached when the toner saver mode is not applied). Put another way, there is a lower limit to the permissible color factor Cl with which the legibility target value can be achieved. To take this into account, in a second embodiment of the present invention, when the color factor Cl is lower than the lower limit, legibility is increased by performing image processing referred to as "contour extraction process" described below on a to-be-printed character.

More specifically, the second embodiment differs from the first embodiment described above in performing the contour extraction process on a character(s) in an original document. Functions and factors similar to those of the first embodiment are identified by like reference numerals, and repeated description is omitted. The second embodiment is described below through a concrete example.

In the contour extraction process, image processing [1] and [2] described below are performed.

[1] Extract contours of a character to convert the character into a contour character.

[2] Convert color of the contours to color that largely differs from paper color in luminance.

Where the method for determining the toner saving ratio Sv according to the second embodiment differs from that of the first embodiment is described below. Legibility is defined as given in Equation (7) below:

$$Legibility = Sz \times Tp \times Cp \times Cl' \times Sv \times Ed \quad (7)$$

where Cl' is a converted color factor determined from an equation, where converted contour color obtained by the image processing [2] described above is used in lieu of character color, similar to the Equation (5) of the first embodiment.

Equation (7) includes multiplication by a contour factor Ed (e.g., multiplication by ten) to take the magnitude of effect of conversion into a contour character by contour extraction on legibility into account.

The method described above allows compensating for the lowered color factor Cl with multiplication by the contour factor Ed, thereby setting the toner saving ratio Sv to a low value. Furthermore, converting a character into a contour character leads to reduction in toner consumption.

Figure 7:
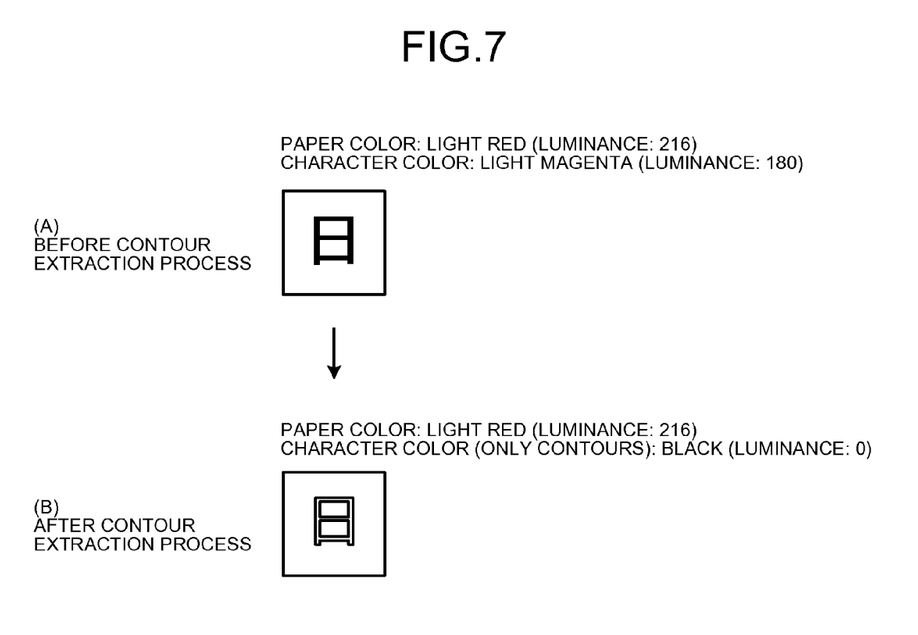
FIG. 7 is an explanatory diagram illustrating an example (images) of character of the document before and after a contour extraction process.

FIG. 7 is a diagram illustrating an example (images) of the character of the document before and after the contour extraction process. FIG. 7 illustrates an image (indicated by (A)), on which the contour extraction process is not performed yet, of a character the color of which is light magenta (luminance: 180) on paper the color of which is light red (luminance: 216) and an image (indicated by (B)), on which the contour extraction process has been performed, of only contours, the color of which is black (luminance: 0), of the character on paper the color of which is light red (luminance: 216).

The example illustrated in FIG. 7 indicates that the image indicated by (A) on which the contour extraction process is not performed yet is low in legibility due to the small difference in luminance between the paper color and the character color. By contrast, the image having undergone the contour extraction process indicated by (B) exhibits the large difference in luminance. Hence, the diagram indicates that legibility of the Kanji character, which is given as an example character, is increased by the process of converting the character into the contour character.

Figure 8:
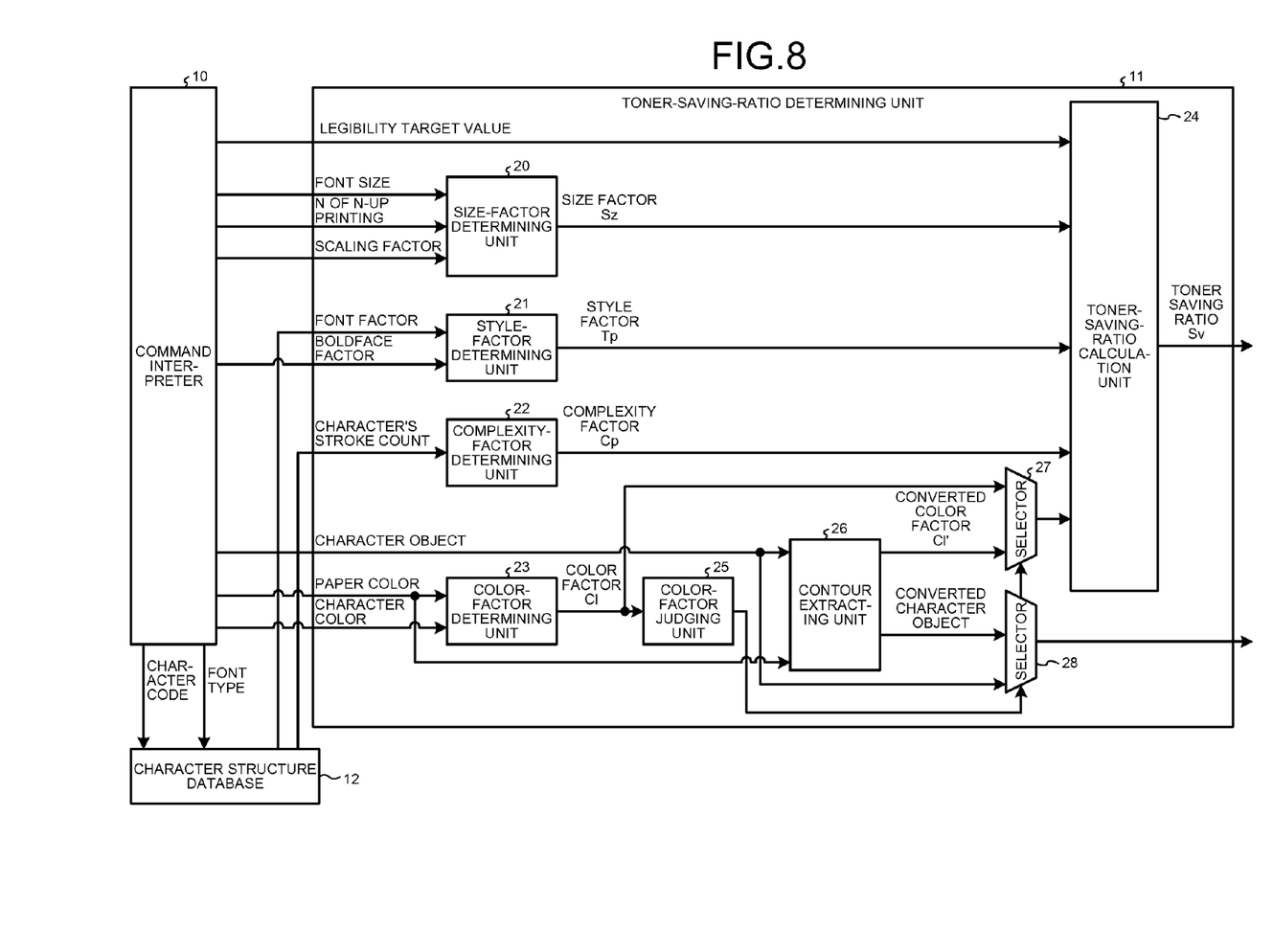
FIG. 8 is a block diagram illustrating an internal configuration of the toner-saving-ratio determining unit of a second embodiment of the present invention.

FIG. 8 is a block diagram illustrating an internal configuration of the toner-saving-ratio determining unit 11 of the second embodiment. The toner-saving-ratio determining unit 11 includes, in addition to the above-described determining units illustrated in FIG. 4, a color-factor judging unit 25, a contour extracting unit 26, and selectors 27 and 28. More specifically, in the toner-saving-ratio determining unit 11 illustrated in FIG. 8, the color-factor judging unit 25, the contour extracting unit 26, and the selectors 27 and 28 are provided on the output side of the color-factor determining unit 23.

The color-factor judging unit 25 judges the color factor Cl output from the color-factor determining unit 23. The contour extracting unit 26 determines the converted color factor Cl' and a converted character object from a character object and paper color fed from the command interpreter 10 and outputs the converted color factor Cl' and the converted character object.

The selector 27 selects either the color factor Cl or the converted color factor Cl' and outputs the selected color factor to the toner-saving-ratio calculation unit 24. The selector 28 selects either the character object or the converted character object and outputs the selected character object to an external entity.

As described above, the toner-saving-ratio determining unit 11 illustrated in FIG. 8 includes, downstream of the color-factor determining unit 23, the color-factor judging unit 25 that makes judgment by comparison against the lower limit. The contour extracting unit 26 calculates the converted color factor Cl' from the converted color of the contours of the character and performs the contour extraction process on the character object.

The selector 27 and the selector 28 select the color factor and the character object, respectively, according to a result of judgment made by the color-factor judging unit 25. If it is judged that the color factor Cl is lower than the lower limit, the selectors 27 and 28 select the converted color factor Cl' and the converted character object output from the contour extracting unit 26.

If it is judged that the color factor Cl is equal to or higher than the lower limit, the selectors 27 and 28 select the color factor Cl output from the color-factor determining unit 23 and the character object fed from the command interpreter 10. In this case, the outputs of the contour extracting unit 26 are not used.

FIG. 9 is a flowchart of processes to be performed by the toner-saving-ratio determining unit 11 illustrated in FIG. 8. Because the processes at step S21 to step S24 and step S28 of FIG. 9 are similar to the processes step S11 to step S14 and step S15 of FIG. 5, operations at step S25 and following steps are described below.

After the color-factor determining unit 23 has determined the color factor Cl at step S24, the color-factor judging unit 25 makes judgment by comparing the color factor Cl against a preset lower limit (step S25). If the result of judgment made by the color-factor judging unit 25 is that the color factor Cl is lower than the lower limit (Yes at step S25), the contour extracting unit 26 performs the contour extraction process (step S26). On the other hand, if the result of judgment made by the color-factor judging unit 25 is that the color factor Cl is equal to or higher than the lower limit (No at step S25), the contour extraction process by the contour extracting unit 26 is skipped, and the toner-saving-ratio calculation process at step S27 is performed.

As described above, when the difference in luminance between the color of each character and the paper color is small, the toner-saving-ratio determining unit 11 converts the character color to color which greatly differs in luminance from the paper color. Accordingly, even when character color and paper color are of such a combination with which necessary legibility cannot be obtained even without the toner saver mode, legibility can be increased by converting the character color.

Furthermore, the toner-saving-ratio determining unit 11 converts the character into a contour character by extracting contours of the character. This process of converting a character into a contour character allows reducing toner consumption while ensuring readability.

In the description given above, program instructions to be executed in the first or second embodiment are provided as being stored in the ROM 53 in advance; however, the program instructions may be provided otherwise. The program instructions to be executed in the embodiment may be provided as a computer program product recorded on a computer-readable recording medium. For instance, the program instructions may be provided as being recorded on a computer-readable recording medium such as a CD-ROM, an FD (flexible disk), a CD-R, or a DVD (digital versatile disk) in an installable or executable format.

The program instructions to be executed in the embodiment may alternatively be stored on a computer connected to a network such as the Internet and provided by being downloaded via the network. The program instructions to be executed in the embodiment may alternatively be configured to be provided or distributed via a network such as the Internet.

The program instructions to be executed in the embodiment has a structure made up of modules providing the functions of the command interpreter 10, the toner-saving-ratio determining unit 11, and the toner-saving processing unit 13 described above. From the viewpoint of actual hardware, the CPU (processor) 52 reads out the program instructions from the recording medium such as ROM 53 and executes the program instructions to load the various units on a main storage device such as the RAM 54. As a result, the units are generated on the main storage device.

According to an aspect of the present invention, an amount of toner consumed in printing characters can be reduced appropriately while avoiding reduction in legibility of the printed characters.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device comprising:
    circuitry configured to,
        receive character information of a character included in a to-be-printed image,
        calculate a plurality factors that affect character legibility of the to-be-printed character based on the character information, and
        calculate a toner saving ratio based on a target value and at least one of the plurality of factors.

2. The image processing device according to claim 1, wherein
    the factors are respectively calculated based on different pieces of the character information.

3. The image processing device according to claim 1, wherein
    the circuitry is configured to calculate of the toner saving ratio by multiplying factors, from among the plurality of factors, with each other.

4. The image processing device according to claim 1 wherein,
    the circuitry is configured such that at least one of the plurality of factors is a size factor calculated by the circuitry based on a character size of the to-be-printed character,
    and the circuitry configured to calculate of the toner saving ratio based on at least the target value and the size factor.

5. The image processing device according to claim 1 wherein,
    the circuitry is configured such that at least one of the plurality of factors is a style factor calculated by the circuitry based on a character style of the to-be-printed character, and
    the circuitry configured to calculate the toner saving ratio based on at least the target value and the style factor.

6. The image processing device according to claim 1 wherein,
    the circuitry is configured such that at least one of the plurality of factors is a complexity factor calculated by the circuitry based on a character structural complexity of the to-be-printed character, and
    the circuitry configured to calculate the toner saving ratio based on at least the target value and the complexity factor.

7. The image processing device according to claim 1 wherein,
    the circuitry is configured such that at least one of the plurality of factors is a color factor calculated by the circuitry based on a character color of the to-be-printed character, and
    the circuitry configured to calculate the toner saving ratio based on at least the target value and the color factor.

8. The image processing device according to claim 7, wherein
    the circuitry is configured to calculate at least the color factor based on difference in luminance between the character color and color of paper on which the to-be-printed character is to be printed.

9. The image processing device according to claim 8, wherein
    the circuitry is configured to convert the character into a contour character, and calculate the toner saving ratio based on a value obtained by associating a first factor among the plurality of factors with factors among the plurality of factors and the target value when the color factor is less than a first threshold value.

10. The image processing device according to claim 9, wherein
    the first factor is a factor for setting the toner saving ratio in low level.

11. The image processing device according to claim 9, wherein the character information includes information of a stroke count of the character.

12. An image processing method comprising:
    receiving character information of a character included in a to-be-printed image;
    calculating a plurality factors that affect character legibility of the to-be-printed character based on the character information; and
    calculating a toner saving ratio based on a target value and at least one of the plurality of factors.

13. The image processing method according to claim 12, wherein the factors to be calculated are respectively based on different pieces of the character information.

14. The image processing method according to claim 12, wherein the calculating a toner saving ratio based on a target value and at least one of the plurality of factors includes calculating the toner saving ratio based on multiplying factors, from among the plurality of factors, with each other.

15. The image processing method according to claim 12 wherein,
    the plurality of factors includes a size factor calculated based on a character size of the to-be-printed character, and
    the toner saving ratio is calculated based on at least the target value and the size factor.

16. The image processing method according to claim 12 wherein,
    the plurality of factors includes a style factor calculated based on a character style of the to-be-printed character, and
    the toner saving ratio is calculated based on at least the target value and the style factor.

17. The image processing method according to claim 12 wherein,
    the plurality of factors includes a complexity factor calculated based on a character structural complexity of the to-be-printed character, and the toner saving ratio is calculated based on at least the target value and the complexity factor.

18. The image processing method according to claim 12 wherein, the plurality of factors includes a color factor calculated based on a character color of the to-be-printed character, and the toner saving ratio is calculated based on at least the target value and the color factor.

19. A non-transitory computer-readable recording medium containing computer-executable program instructions that, when executed by at least one processor, cause the at least one processor to perform operations including:

receiving character information of a character included in a to-be-printed image;

calculating a plurality factors that affect character legibility of the to-be-printed character based on the character information; and calculating a toner saving ratio based on a target value and at least one of the plurality of factors.

20. The non-transitory computer-readable recording medium according to claim 19, wherein the factors to be calculated are respectively based on different pieces of the character information.

\* \* \* \* \*